United States Patent [19]

Fiedler et al.

[11] Patent Number: 4,746,707

[45] Date of Patent: May 24, 1988

[54] PROCESS FOR THE SELECTIVE HYDROGENATION OF UNSATURATED COMPOUNDS

[75] Inventors: Paul Fiedler, Cologne; Hartmuth Buding, Dormagen; Rudolf Braden, Odenthal-Scheuren; Joachim Thörmer, Leverkusen, all of Fed. Rep. of Germany

[73] Assignee: Bayer Aktiengesellschaft, Leverkusen, Fed. Rep. of Germany

[21] Appl. No.: 891,618

[22] Filed: Aug. 1, 1986

[30] Foreign Application Priority Data

Aug. 16, 1985 [DE] Fed. Rep. of Germany ....... 3529252

[51] Int. Cl.$^4$ ............................................. C08F 8/04
[52] U.S. Cl. ................................... 525/338; 525/329.3
[58] Field of Search .............................. 525/338, 329.3

[56] References Cited

U.S. PATENT DOCUMENTS

| 2,585,583 | 2/1952 | Pinkney | 525/329.3 |
| 3,625,927 | 12/1971 | Yoshimoto et al. | 525/329.3 |
| 3,700,637 | 10/1972 | Finch, Jr. | 525/329.3 |
| 4,581,417 | 4/1986 | Buding et al. | 525/329.3 |
| 4,631,315 | 12/1986 | Buding et al. | 525/329.3 |
| 4,647,627 | 3/1987 | Buding et al. | 525/329.3 |

*Primary Examiner*—Joseph L. Schofer
*Assistant Examiner*—Bernard Lipman
*Attorney, Agent, or Firm*—Connolly & Hutz

[57] ABSTRACT

The selective hydrogenation in a homogeneous phase of unsaturated compounds carrying reducible groups containing nitrogen so as to preserve the reducible groups containing nitrogen succeeds with excellent yields if a compound corresponding to the following general formula:

$$RuH_m(R_1CO_2)_n(L)_p$$

wherein
  $R_1$ represents an optionally substituted alkyl, aryl, cycloalkyl or aralkyl group;
  L represents a phosphane or arsane;
  m represents 0 or 1;
  n represents 1 or 2; and
  p represents 2 or 3;
is used as catalyst.

8 Claims, No Drawings

PROCESS FOR THE SELECTIVE HYDROGENATION OF UNSATURATED COMPOUNDS

This invention relates to a process for the selective hydrogenation of unsaturated, optionally high molecular weight, compounds carrying reducible groups containing nitrogen.

It is known that CC-double bonds may be selectively hydrogenated on solid catalysts in the presence of reducible groups containing nitrogen. Palladium or platinum catalysts are used for this purpose and yields of up to 90% are obtained (Houben Weyl, Methoden der Organischen Chemie, Volume IV, 1c, Reduktion I (1980), page 168). The selectivity is, however, in many cases unsatisfactory. Thus, only 31% of the desired 1-cyanocyclohexane is obtained when platinum oxide is used for the hydrogenation of 1-cyanocyclohexene. (See M. Freifelder, Practical Catalytic Hydrogenation, (1971), page 157).

It is also known to hydrogenate unsaturated nitriles with the aid of rhodium complexes as homogeneous catalysts (Wilkinson complexes). The cyano group is not hydrogenated in this reaction, but the nitriles may cause inactivation of the catalyst due to ligand exchange (see Houben Weyl, loc cit, pages 57 to 60).

Since rhodium complexes of the formula $(C_6H_5)_3P_3Rh^IX$ are also suitable for the hydrogenation of nitriles (DE-AS 1,793,616, column 2, line 51), the hydrogenation of olefinic double bonds cannot always be expected to be sufficiently selective in the presence of nitrile groups.

It is known from U.S. Pat. No. 3,454,644 that phosphane-containing complexes of the type $L_nMX_2$ (L represents CO or tertiary phosphine; n represents 3 or 4; M represents ruthenium or osmium; and X represents halogen and/or hydrogen) may be used for the hydrogenation of keto, formyl, nitrile, non-aromatic —C=C— and —C≡C— groups, these complexes invariably hydrogenating all the groups of this type present.

Hydridocarboxylato-tris-triphenyl phosphaneruthenium complexes have a catalytic activity for the hydrogenation of 1-olefins (J. Chem. Soc. (A) 1969, pages 2610–2615), but they fail to hydrogenate olefins which are substituted or have non-terminally situated olefinic bonds. This is presumably due to steric hindrance by the triphenyl phosphane ligands which prevent transfer of hydride.

Cationic ruthenium complexes which are suitable as homogeneous catalysts for the hydrogenation of olefins in acid, methanolic solution are described in J. C. S. Dalton 1973, pages 846–854. These complexes also fail to hydrogenate double bonds in internal positions.

$RuH(CF_3CO_2)(PPh_3)_3$ (Ph represents phenyl) may also be used as catalyst for the partial hydrogenation of conjugated dienes (Litvin, E. F.; Freidlin, L. Kh. and Karinov, K. G.; in Neftkhimiya 12 (1972) 3, 318–323).

Particularly problematic is the selective hydrogenation of polymeric, unsaturated compounds which carry reducible groups containing nitrogen since the by-products formed may only be separated with great difficulty if at all.

It is known from U.S. Pat. No. 3,700,637 that the CC-double bonds of diene-(meth)acrylonitrile copolymers containing a high proportion of alternating dienenitrile units may be homogeneously hydrogenated with rhodium-halogen complex catalysts in chlorobenzene. It is also indicated that other metals, such as platinum, ruthenium, iridium, palladium, rhenium, cobalt or copper, are suitable for homogeneous or heterogeneous catalysts.

DE-OS No. 2,539,132 postulates a solvent-dependent selective hydrogenation of butadiene-acrylonitrile copolymers with the aid of the known rhodium catalyst which preserves the CN-triple bonds and cis-double bonds and hydrogenates the vinylic and trans-double bonds quantitatively if chlorobenzene is used as solvent. If other solvents are used, in particular ketones, only low degrees of hydrogenation are achieved.

Furthermore, the homogeneous or, preferably, heterogeneous hydrogenation of unsaturated polyhydroxy hydrocarbons having molecular weights of up to 4,000 with the aid of ruthenium catalysts with preservation of the hydroxyl groups is disclosed in DE-OS No. 2,459,115. It is stated there that aliphatic hydrocarbons, aromatic hydrocarbons, alcohols, ethers, esters and water may be used as solvents for heterogeneous hydrogenation, but no corresponding statements are made for homogeneous hydrogenation. It is said that the polymers may also contain, for example, acrylonitrile as comonomer; no detailed descriptions are given, but it may be remembered that it is known from U.S. Pat. No. 3,454,644, Example IX, that the nitrile group of benzonitrile is hydrogenated to the amino group by homogeneous ruthenium catalysis in ethanol.

Since the occurence of rhodium is rare and rhodium is used not only in the chemical industry, but predominantly also in the electrical, glass and ceramics industry and recently especially also in the motor vehicle industry (exhaust gas catalysts), the possibility of a shortage of this precious metal in the future cannot be excluded.

It is an object of the present invention to provide a new process of homogeneous hydrogenation which would be independent of rhodium for the selective hydrogenation of unsaturated compounds carrying reducible groups containing nitrogen, which process would also enable polymeric unsaturated compounds carrying reducible groups containing nitrogen to be hydrogenated without loss of the reducible groups containing nitrogen.

This problem may surprisingly be solved by a homogeneous reaction using ruthenium carboxylate complexes.

The present invention thus relates to the homogeneous hydrogenation of unsaturated compounds carrying reducible groups containing nitrogen with preservation of the reducible groups containing nitrogen, characterised in that the catalyst used is a compound corresponding to the following general formula:

$$RuH_m(R_1CO_2)_n(L)_p$$

wherein
R$_1$ represents optionally substituted alkyl, aryl, cycloalkyl or aralkyl;
L represents a phosphane or arsane,
m represents 0 or 1;
n represents 1 or 2; and
p represents 2 or 3.

The alkyl groups may be, for example, straight- or branched-chain saturated hydrocarbon groups having from 1 to 20, preferably from 1 to 12, most preferably from 1 to 6, carbon atoms.

The cyclo-alkyl groups may consist, for example, of cyclic, saturated hydrocarbon groups having from 5 to 7 carbon atoms.

Examples of suitable aryl groups include aromatic hydrocarbon groups of the benzene series having from 6 to 18, preferably from 6 to 10, carbon atoms.

Examples of aralkyl groups include aryl-substituted alkyl groups consisting in their aliphatic moiety of a straight or branched-chain hydrocarbon group having from 1 to 6 carbon atoms and in the aromatic moiety of a group of the benzene series, preferably phenyl.

The alkyl, cycloalkyl, aryl and aralkyl groups described above may be substituted with hydroxyl, $C_1$-$C_6$ alkoxy, $C_1$-$C_6$ carbalkoxy, fluorine, chlorine or di-$C_1$-$C_4$-alkylamino, and the cycloalkyl, aryl and aralkyl groups may in addition be substituted by $C_1$-$C_6$ alkyl groups, and the alkyl, cycloalkyl and aralkyl groups may contain keto groups.

Examples of groups $R_1$ include methyl, ethyl, propyl, isopropyl, tertiary butyl, cyclohexyl, phenyl, benzyl and trifluoromethyl.

Methyl, ethyl and tertiary butyl are preferred groups $R_1$.

Examples of ligands L include those corresponding to the following general formulae:

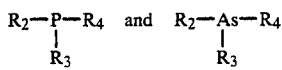

wherein $R_2$, $R_3$ and $R_4$ which may be the same or different, conform to the definition for $R_1$.

The following are preferred ligands L: triphenyl phosphane, diethylphenyl phosphane, tritolyl phosphane, trinaphthyl phosphane, diphenyl methyl phosphane, diphenyl butyl phosphane, tris-(p-carbomethoxy phenyl)phosphane, tris-(p-cyanophenyl)-phosphane, tributyl phosphane, tris-(trimethoxy phenyl)-phosphanes, bis-(trimethylphenyl)-phenyl phosphanes, bis-(trimethoxy phenyl)-phenyl phosphanes, trimethyl phenyl diphenyl phosphanes, trimethoxyphenyl diphenyl phosphanes, bis-(dimethylphenyl)-phenyl phosphanes, tris-(dimethoxy phenyl)-phosphanes, bis-(dimethoxy phenyl)-phenyl phosphanes, dimethylphenyl diphenyl phosphanes, dimethoxy phenyl diphenyl phosphanes, triphenyl arsane, ditolyl phenyl arsane, tris-(4-ethoxyphenyl)-arsane, diphenyl cyclohexyl arsane, dibutyl phenyl arsane and diethyl phenyl arsane.

Triaryl phosphanes are preferred, in particular triphenyl phosphane.

Some of the complexes used are known. They may be prepared, for example, directly from hydrated ruthenium trichloride in the presence of an excess of the ligand L and of the sodium salt of the corresponding carboxylic acid or from the corresponding complex $RuCl_2L_3$ with the sodium salt of a carboxylic acid (R. W. Mitchell, A. Spencer and G. Wilkinson in J. C. S. Dalton 1973, page 852). Other methods of preparation are described by D. Rose, J. D. Gilbert, R. P. Richardson and G. Wilkinson in J. Chem. Soc. (A) 1969, page 2914, 2915 and A. Dobson, S. D. Robinson and M. F. Uttley in J. C. S. Dalton 1975, page 376.

Examples of unsaturated compounds carrying reducible groups containing nitrogen include nitriles, imines and oximes, nitriles being preferred.

The high molecular weight, unsaturated compounds carrying reducible groups containing nitrogen are preferably copolymers containing nitrile groups obtained from 85 to 50%, by weight, preferably from 82 to 55%, by weight, of at least one conjugated diene, from 15 to 50%, by weight, preferably from 18 to 45%, by weight, of at least one unsaturated nitrile and from 0 to 10%, by weight, preferably from 0 to 8%, by weight, of at least one other monomer capable of being copolymerised with conjugated dienes and unsaturated nitriles.

Examples of suitable conjugated dienes include butadiene-(1,3), 2-methyl-butadiene-(1,3), 2,3-dimethyl butadiene-(1,3) and pentadiene-(1,3). Acrylonitrile and methacrylonitrile are suitable unsaturated nitriles.

The monomers used may also be aromatic vinyl compounds, such as styrene, o-, m- or p-methyl styrene, ethyl styrene, vinyl naphthalene or vinyl pyridine, $\alpha,\beta$-unsaturated monocarboxylic acids containing from 3 to 5 carbon atoms, such as acrylic acid, methacrylic acid or crotonic acid, or $\alpha,\beta$-unsaturated dicarboxylic acids containing 4 or 5 carbon atoms, such as maleic, fumaric, citraconic or itaconic acid, or vinyl chloride, vinylidene chloride, N-methylol acrylamide or vinyl alkyl ethers having from 1 to 4 carbon atoms in the alkyl moiety.

The compound hydrogenated is preferably a binary copolymer of butadiene and acyrlonitrile.

The molecular weight of the polymer is not critical and is generally in the region of from 500 to 500,00 g/mol, preferably from 1,000 to 200,000 g/mol, more preferably from 30,000 to 150,000 g/mol (numerical average determined by gel permeation chromatography).

The conversion rates or degrees of hydrogenation (percentage of hydrogenated CC-double bonds based on the total number of CC-double bonds originally present in the polymer) may amount to as much as 100%, but hydrogenation may be stopped at an earlier stage if necessary. The polymers obtained by the process according to the present invention preferably have degrees of hydrogenation of over 80%, in particular above 90%, especially above 95%, most preferably above 99%.

Hydrogenation may be carried out solvent-free, especially if the process is carried out on low molecular weight, liquid compounds, or it may be carried out in solution.

Suitable solvents for hydrogenation include in particular low molecular weight ketones having from 3 to 10 carbon atoms, such as acetone, butanone, pentanones, cyclopentanone, cyclohexanone and acetophenone.

The concentration of unsaturated compound, based on the whole homogeneous phase, should be at least 1, and is preferably from 5 to 40%, by weight.

The concentration of catalyst (calculated as ruthenium) based on the unsaturated compound, generally amounts to from 10 to 1,000, preferably from 40 to 600, ppm.

Hydrogenation is suitably carried out at from 80° to 200° C., preferably from 100° to 180° C., in particular from 115° to 160° C., and under a hydrogen pressure of from 1 to 350 bar, preferably from 20 to 250 bar.

The catalyst may be removed by the conventional methods after the reaction and the product may be purified, e.g. by distillation or crystallization.

If the process is carried out on a high molecular weight compound, the polymer is removed from the solution by the conventional methods, such as evaporation, injection of steam or the addition of non-solvent. This is followed by drying to remove any residues of solvent or water.

When diene-(meth)acrylonitrile copolymers are hydrogenated in chlorobenzene by the state of the art process using rhodium complex catalysts and the reaction solutions are worked-up by the injection of steam to recover the solid polymers, thick layers of polymer collect on the wall and stirrer of the stripper. This necessitates periodic opening of the stripper for mechanical cleaning. In addition, the moist lumps of polymer removed rapidly clog up the screen used for draining off the water so that frequent cleaning of the screen is also necessary.

It has now been found that the polymer solutions obtained by the process according to the present invention may easily be worked-up by the injection of steam to recover the solid polymer without forming deposits on the stripper wall, stirrer or screen and also that no mechanical cleaning of the stripper is required after the product has been worked-up.

The polymers which have been hydrogenated according to the present invention may be cured by peroxide or sulphur vulcanisation in the conventional manner unless vulcanisation is carried out by a process of cross-linking by irradiation.

The excellent resistance thereof to weathering and the action of ozone, oil and hot air and resistance to cold climates enables these polymers to be used for high quality rubber products, such as gaskets, hoses and membranes and cable insulations and sheaths.

The low molecular weight compounds carrying reducible groups containing nitrogen and hydrogenated according to the present invention are valuable intermediate products for the preparation of active substances.

EXAMPLE 1

A carefully degasified solution of 160 g of a statistical butadiene-acrylonitrile copolymer containing 34.9%, by weight, of acrylonitrile and having a Mooney viscosity ML 1+4 (100° C.) of 29 and 350 mg of $RuH(CH_3CO_2)(PPh_3)_3$ in 1.6 kg of butanone was introduced into a 3 liter autoclave being flushed by nitrogen. The solution was heated to 145° C. and hydrogenated at a hydrogen pressure of 140 bar for 4 hours. The degree of hydrogenation of the polymer was determined by IR spectroscopy to be 99%.

EXAMPLES 2 TO 6

Hydrogenations were carried out by the same method as in Example 1, using 200 ppm of ruthenium in the form of various complexes. The results are entered in Table 1.

TABLE 1

| Catalyst | $RuH(RCO_2)(PPh_3)_3$ | | | | | 200 ppm |
|---|---|---|---|---|---|---|
| Example No. | 2 | 3 | 4 | 5 | 6 | |
| R: | $CH_3CH_2$ | $(CH_3)_3C$ | $C_6H_5$ | $C_6H_5CH_2$ | $CF_3$ | |
| Degree of hydrogenation | 99.7 | 99.6 | 98.1 | 99.0 | 97.8 (%) | |

EXAMPLE 7

22 g of cyclohexane nitrile in 150 ml of acetone were hydrogenated at 125° C. under a hydrogen pressure of 100 bar for 4 hours in the presence of 62 mg of $RuH(CH_3CO_2)(PPh_3)_3$.

The conversion rate was 100%. No amines could be detected.

EXAMPLE 8

47 g of cyclohexene carbaldoxime in 120 ml of 3-methyl-2-pentanone were hydrogenated at 125° C. under a hydrogen pressure of 120 bar for 3 hours in the presence of 100 mg of $RuH(CH_3)_2CHCO_2(PPh_3)_3$.

The conversion rate was 77%. No hydrogenation products of the oxime group could be detected.

EXAMPLE 9

Example 1 was repeated with 300 ppm of Ru in the form of $Ru(CH_3CO_2)_2(PPh_3)_2$. The degree of hydrogenation (IR spectroscopically) was more than 99% after 3 hours.

What is claimed is:

1. Process for the selective hydrogenation in the homogeneous phase of ethylenically unsaturated compounds carrying nitrile groups, characterised in that the catalyst used is a compound corresponding to the following general formula:

$$RuH_m(R_1CO_2)_n(L)_p$$

wherein
  $R_1$ represents optionally substituted alkyl, aryl, cycloalkyl or aralkyl;
  L represents a phosphane or arsane;
  m represents 0 or 1;
  n represents 1 or 2; and
  p represents 2 or 3.

2. Process according to claim 1, characterised in that the ethylenically unsaturated compound carrying nitrile groups is a copolymer obtained from 85 to 50%, by weight, of at least one conjugated diene, from 15 to 50%, by weight, of at least one unsaturated nitrile and from 0 to 10%, by weight, of at least one other monomer which is copolymerisable with conjugated dienes and unsaturated nitriles.

3. Process according to claim 1, characterised in that the solvent used is a low molecule weight ketone having from 3 to 10 carbon atoms.

4. Process according to claim 1, characterised in that the ligands L used are triaryl phosphanes.

5. Process according to claim 1, characterised in that the ligand L used is triphenyl phosphane.

6. Process according to claim 1, characterised in that $R_1$ represents methyl, ethyl, or tertiary butyl.

7. Process according to claim 1, characterised in that hydrogenation is carried out at from 80° to 200° C.

8. Process according to claim 1, characterised in that hydrogenation is carried out under a hydrogen pressure of from 1 to 350 bar.

* * * * *

UNITED STATES PATENT AND TRADEMARK OFFICE
CERTIFICATE OF CORRECTION

PATENT NO. : 4,746,707
DATED : May 24, 1988
INVENTOR(S) : Fiedler et al.

It is certified that error appears in the above-identified patent and that said Letters Patent is hereby corrected as shown below:

Column 6, line 3, "cyclohexane" should read --cyclohexene--.

Signed and Sealed this

Eighth Day of November, 1988

Attest:

*Attesting Officer*

DONALD J. QUIGG

*Commissioner of Patents and Trademarks*